United States Patent [19]

Watlington et al.

[11] Patent Number: 4,991,993
[45] Date of Patent: Feb. 12, 1991

[54] LOCK COUPLING

[75] Inventors: Larry D. Watlington, Rte. 1, Box 286, Colorado City, Tex. 79512; Nathan T. Haynes, Rte. 3, Box 309, Sweetwater, Tex. 79556

[73] Assignees: Larry D. Watlington, Colorado City, Tex.; Nathan T. Haynes

[21] Appl. No.: 547,858

[22] Filed: Jul. 3, 1990

[51] Int. Cl.⁵ .......................... B25G 3/02; F16D 1/00
[52] U.S. Cl. .................................. 403/365; 403/344; 74/434; 474/902; 29/402.08
[58] Field of Search .............. 403/365, 366, 344; 74/434, 439; 474/902, 903; 29/402.08

[56] References Cited

U.S. PATENT DOCUMENTS

| | | | |
|---|---|---|---|
| 631,957 | 8/1899 | Diescher | 403/372 X |
| 668,307 | 2/1901 | Fenlason | 474/98 |
| 764,399 | 7/1904 | Villiger, Jr. | 403/344 X |
| 769,414 | 9/1904 | Simmons | 403/344 X |
| 2,269,821 | 1/1942 | Kemphert et al. | 474/902 X |
| 2,287,343 | 6/1942 | Duda | 403/344 X |
| 4,016,770 | 4/1977 | Enters | 403/313 X |

Primary Examiner—Andrew V. Kundrat
Attorney, Agent, or Firm—Wendell Coffee

[57] ABSTRACT

Gears with a soft metal hub and a hexagonal coaxial hole in the hub, often need repair. Accordingly the old hub is removed and a new solid plug is pressed in place and welded. A radial face on the plug and the gear are flush. A lock plate is placed on this radial face and wleded along an arc. Then the assembly has an axial circular hole bored therethrough and then a hexagonal hole is broached therein. The lock plate has two ears opposite the weld which receive a bolt.

8 Claims, 2 Drawing Sheets

LOCK COUPLING

CROSS REFERENCE TO RELATED APPLICATION

None.

RIGHTS TO INVENTIONS UNDER FEDERAL RESEARCH

There was no federally sponsored research and development concerning this invention.

BACKGROUND OF THE INVENTION (1) Field of the Invention

This invention relates to the repair of worn gears on agricultural machinery and the making of replacements of worn gears for agricultural machinery.

(2) Description of the Related Art

In agricultural machinery, machine parts are made to use rotating hexagonal shafts. To rotate these hexagonal shafts, gears having hexagonal holes therethrough are press fitted upon the shafts. A typical example of an arrangement of this type involves cotton strippers with two rollers operating on either side of the cotton stalk. These rollers rotate in opposite direction so that the cotton bolls may be stripped from the cotton stalk. These rollers have brushes and bars. To effectively strip the cotton the from the stalk, the brushes and bars are timed so that they exactly meet as they rotate. The rollers as stated before, are mounted upon hexagonal shafts which are driven by gears having hexagonal holes. The gears are pressed upon the shaft. However, through wear and particularly through dust and dirty conditions in which these are located, the gears tend to wear at the hexagonal hole in the hub. Normally the gear is of a hard steel construction whereas the hub is a separate member which has softer metal. If the hub becomes loose, it quickly wallows out and wears quickly so that it is loose upon the shaft and no longer maintains the brushes and gears in exact alignment. Also, of course, as soon as it becomes loose, this is inductive to other wear and particularly upon the gear teeth themselves.

Also often when the hub begins to wear it will damage the shaft so that not only must the gear be replaced but also the shaft.

The prior art discloses clamps or locks to clamp sheaves pulleys upon primarily round shafts, inasmuch as round shafts are more common in machine elements.

Before this application was filed the inventors were aware of the following U.S. patents:

| | |
|---|---|
| DIESCHER | 631,957 |
| FENLASON | 668,307 |
| SIMMONS | 769,414 |
| KEMPHERT ET AL | 2,269,821 |
| DUDA | 2,287,343 |
| ENTERS | 4,016,770 |

DIESCHER discloses a split hub in FIGS. 1 and 2. The hub is integral with the pulley. A cylindrical or helical gripping member is located between the hub and the circular shaft. In other embodiments, not only is the hub split but so is the pulley itself.

FENLASON discloses a pulley wherein U-bolts are used to clamp the parts to the circular shaft.

SIMMONS discloses a split pulley clamped to a round shaft by bolts.

KEMPHERT ET AL discloses a sheave to fit a circular shaft which has a key-way therein. The hub itself is separate from the sheave and is attached thereto by bolting and a taper. The entire length of the hub is slit.

DUDA discloses a gear for a circular shaft wherein the hub is integral with the gear. The hub is split but the gear is not.

ENTERS shows a clamp to attach a fabricated pulley or sheave to a round shaft having a key. It is particularly adapted for a sheave fabricated from stamped sheet metal.

SUMMARY OF THE INVENTION (1) Progressive Contribution to the Art

We have invented a clamp or lock particularly adapted to clamping gears to hexagonal shafts. The gears are normally fabricated by gear manufacturers having circular holes therethrough, therefore according to this invention a soft or a mild steel or a softer material than the hard metal of which the gear is made is inserted into the round hole of the gear. Also a clamp is welded to the face of the gear. At the time the parts are welded to the gear, both are solid plugs. Thereafter, an axial circular hole is bored through the exact axis of the gear. After the round hole is bored the round hole is broached to the hexagonal shape. We have found that in this manner it is possible to have the hexagonal hole centered within the gear and also with the clamp upon one side of the gear that it is possible to tighten and secure the gear to a hexagonal shaft so that it does not become loose through wear. If any movement is permitted between the gear hub and the shaft they will rapidly deteriorate.

(2) Objects of this Invention

An object of this invention is to secure a gear to a hexagonal shaft.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

Figure 1:
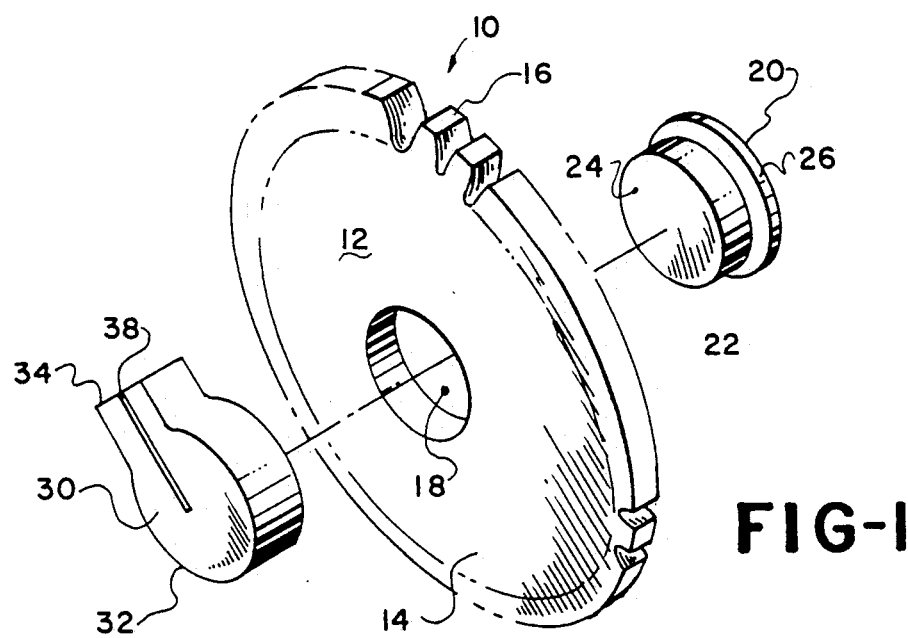
FIG. 1 is an exploded perspective view showing the three parts that are assembled to form the gear assembly according to this invention.
Figure 2:
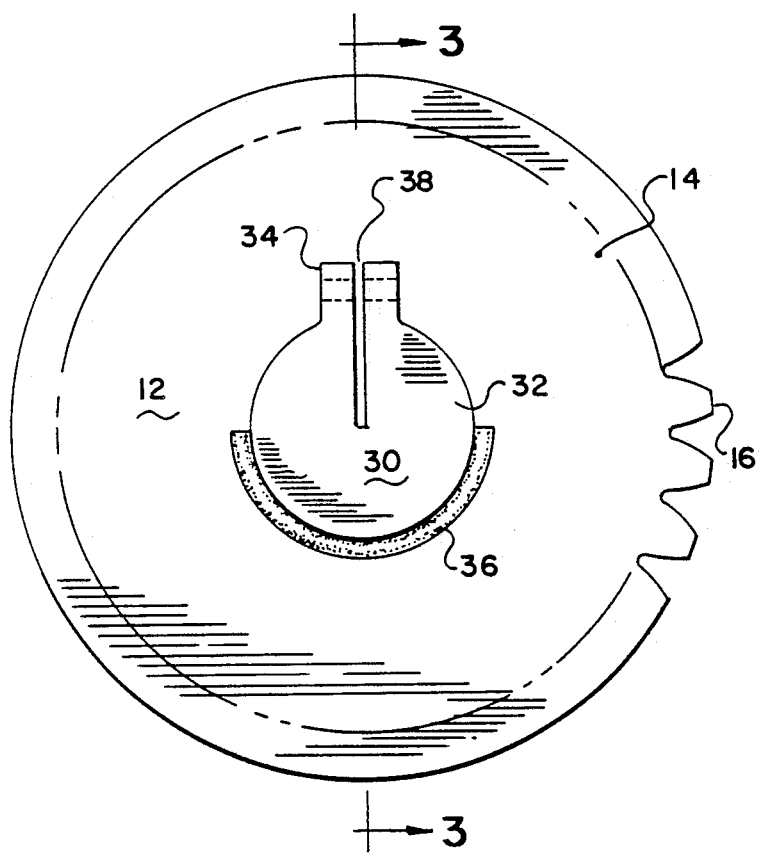
FIG. 2 is an elevational view showing the parts assembled with the plug and lock before being bored.
Figure 3:
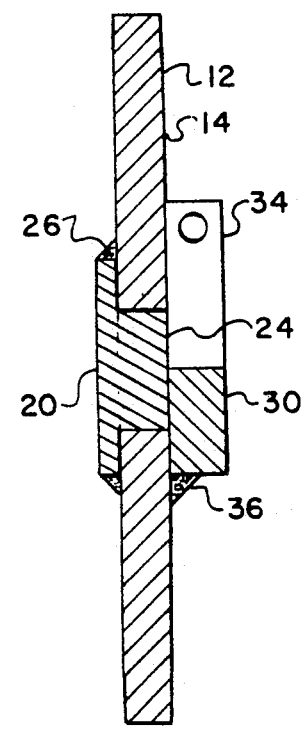
FIG. 3 is a sectional view taken substantially on line 3—3 of FIG. 2.
Figure 4:
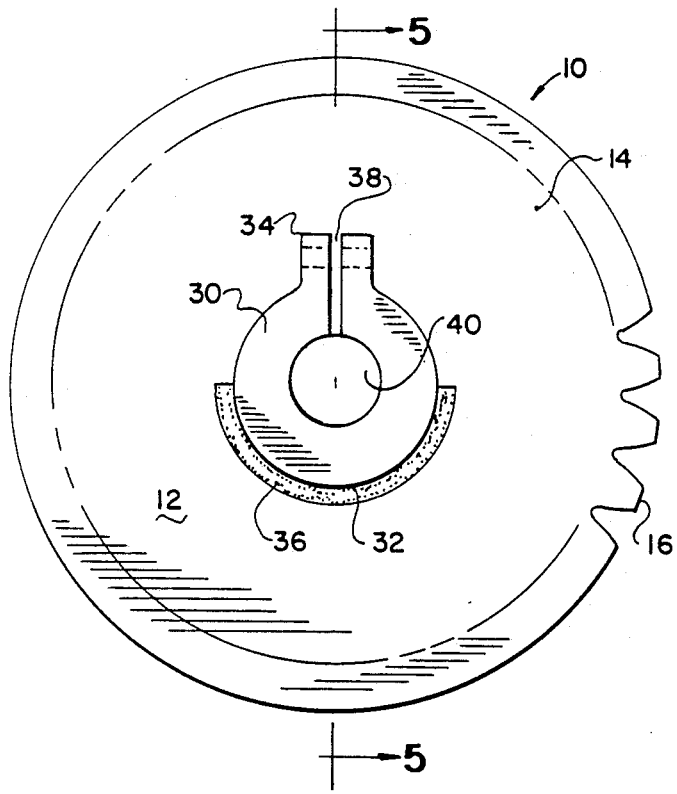
FIG. 4 is a top elevational view similar to FIG. 2 showing the plug and clamp with a circular axial hole bored therethrough.
Figure 5:
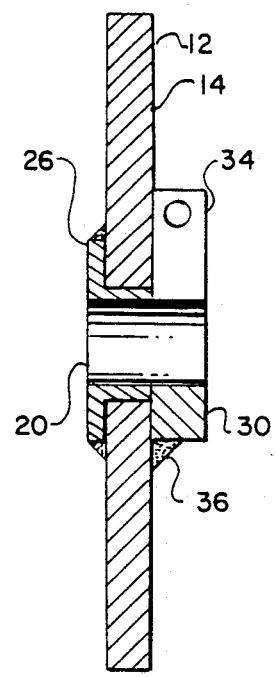
FIG. 5 is a sectional view taken substantially on line 5—5 of FIG. 4.
Figure 6:
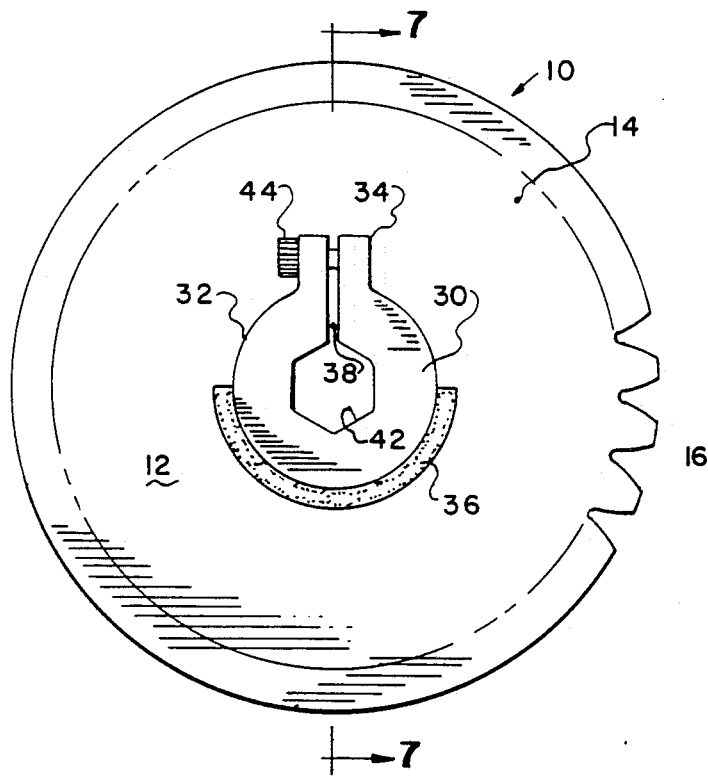
FIG. 6 is a top elevational view substantially similar to FIG. 2 with a hexagonal hole broached at the axis of the hub.
Figure 7:
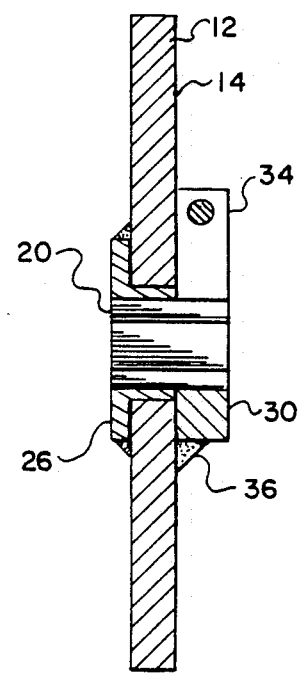
FIG. 7 is a cross sectional view taken substantially on line 7—7 of FIG. 6.

As an aid to correlating the terms of the claims to the exemplary drawings, the following catalog of elements and steps is provided:

10: assembly
12: gear
14: radial face
16: gear teeth
18: circular hole
20: hub
22: circular periphery
24: radial face
26: flange
30: lock plate
32: circular portion
34: ears
36: weld
38: slot
40: axial hole
42: hex hole
44: bolt

DESCRIPTION OF THE PREFERRED EMBODIMENTS

Referring to the drawings it may be seen that there are basically three elements to gear assembly 10. These are identified as the gear plate or gear 12; plug or hub 20; and lock plate 30. The gear plate has radial face 14. Gear teeth 16 are along the circular periphery of the gear 12. Circular axial hole 18 extends through the gear 12. As stated above the gear 12 or gear plate is a single element.

Likewise plug 20 is a single element. Before the hub 20 is bored preparatory to broaching, it is, sometimes referred to as a plug. Plug 20 has cylindrical periphery 22 which is the same diameter as the circular hole 18. Therefore the plug 20 has a press fit with circular periphery 22. The plug has radial face 24. On the end of the plug away from the radial face the hub may have a flange 26.

Gears are purchased new, different manufacturers and different gears have different diameters circular holes 18 therethrough. When the gear is purchased it must have the same number of gear teeth 16 and also the sam pitch diameter of the gear teeth. However, it is not necessary to find one that has the same circular hole therethrough. This is because the plug or hub 20 is of mild steel or softer metal than the gear 12 and it is readily machineable. Therefore if the manufacturer finds some gears which are suitable except for the size hole, it's a simple matter for the manufacturer to buy cylindrical shafting of a slightly larger size and machine the shafting down so that it has a circular periphery 22 which forms a press fit with the circular hole 18.

If through chance, circular hole 18 is the same as the outside diameter 22 of the plug 20, no machining will be necessary. It is necessary upon the first assembly step that the radial face 24 is smooth and flush with and in the same plane as the radial face 14. If the plug 20 is machined so that there is a flange 26, the flange 26 is formed so that it holds the plug in place with the radial faces flush as described.

The lock plate 30 has cylindrical portion 32. It may be considered to be a circular plate with two ears 34 projecting from it. The circular portion 32 has a diameter larger than the circular hole 18 through the gear but the outer diameter of the circular portion 32 is far less than the pitch diameter of the gear teeth 16. The lock plate is placed upon the radial face 14 of the gear plate 12 so the circular portion is co-axial with the gear plate. Although it should be co-axial, precision is not necessary on attaching it. After it is in place it is welded by weld 36 which is located along an arc opposite the ears 34. The arc of the weld metal is no greater than half the circumference of the circular portion. I.e., at least half of the lock plate which would be a fourth on either side of each ear is not welded to the gear. Therefore the lock plate may spring and be clamped to the hexagonal shaft when in use. Through manufacture there may be a slight clearance or space between the ears 34 and the radial face 14 of the gear plate 12.

The plug 20 is welded to the gear plate 12 on the side of the gear plate opposite the radial face.

It will be understood that if the gear 12 is being repaired that the original gear would be removed from the shaft and the original or worn hub would be removed from the gear and discarded.

After the lock plate 30 and the hub 20 are welded to the gear plate 12 an axial hole 40 is formed through the plug 20 and the lock plate 30. This axial hole needs to be a precision operation, i.e., it needs to be co-axial with the pitch circle of the gear teeth 16. For that reason the preferred method of forming the hole is to place the gear assembly 10 which includes the gear plate 12 with the hub 20 and the lock plate 30 onto the chuck of a lathe and bore the hole 40 through the axis of the gear. It is preferred that the hole be the diameter that is equal to the distance between flats of the hexagonal hole which will be formed in the hub.

After a circular axial hole 40 is bored through the hub 20 and lock plate 30 the hole is broached to form hexagonal hole 42. The broaching process is such that the hexagonal hole 40 will be a precisely at the axis. Lock plate ears are separated by slot 38. The slot in the original lock plate blank will extend into the plate within the circular portion 32. The broach is positioned when broaching the axial hole 40 so that one corner of the hexagonal hole 40 will be at the slot 38. Therefore when the slot is pulled together by bolt 44 the hexagonal hole will fit tightly upon its shaft, securely clamping the assembly 10 upon the shaft. One of the ears is bored to receive the bolt 44 and the other ear has a smaller bore and is tapped to mate the bolt threads. It is preferred to use a round bolt head with an Allen (hexagonal) insert therein so that the bolt may be tightened with very little clearance between the gear plate 12 and the outer edge of the lock plate 30. Often these gears are placed where there is a limited amount of space to be used.

Therefore it may be seen that we have provided a method of repairing damaged gears or building replacement gears.

The embodiment shown and described above is only exemplary. We do not claim to have invented all the parts, elements or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:

1. A gear with a radial face and gear teeth at its periphery, comprising:

a. a hexagonal gear hole concentric with the gear teeth,
b. a lock plate on the face of the gear,
c. the lock plate having a cylindrical peripheral shape concentric with said gear teeth,
d. a hexagonal lock hole in the lock plate aligned with the hexagonal gear hole,
e. ears on the lock plate,
f. a slot between the ears, said slot extending to the hexagonal hole,
g. said lock plate welded to the gear along an arc away from the ears, and
h. a bolt through the ears for clamping the gear upon a hexagonal shaft.

2. The invention as defined in claim 1 wherein,
i. said welded arc being less than about a semicircle.

3. The invention as defined in claim 1 further comprising:
i. a bolt through a hole in one ear,
j. said bolt threaded into threads in the other ear,
k. said bolt having a round head with hexagonal insert whereby the bolt can be tightened to clamp the gear assembly upon a hexagonal shaft.

4. The invention as defined in claim 1 wherein said gear is
i. a flat plate and a part of
j. a gear assembly which also includes
k. a hub with said hexagonal gear hole therein, and
l. said hub is in a circular hole in the gear plate.

5. The invention as defined in claim 4 further comprising:
m. a bolt through a hole in one ear,
n. said bolt threaded into threads in the other ear,
o. said bolt having a round head with hexagonal insert whereby the bolt can be tightened to clamp the gear assembly upon a hexagonal shaft.

6. The invention as defined in claim 5 wherein,
p. said welded arc being less than about a semicircle.

7. The method of making
a. a gear assembly from,
   i. a gear with a radial face, a circular hole at its axis, and gear teeth at its periphery,
   ii. a cylindrical plug having a diameter equal to said circular hole, and
   iii. a lock plate with a cylindrical portion, two ears projecting therefrom, and a slot between the two ears extending to about the axis of the cylindrical portion;
b. comprising the steps of:
c. pressing said cylindrical plug in said circular hole with a radial face of said plug flush with said radial face,
d. placing the lock plate on said radial face,
e. welding said lock plate to said radial face along an arc away from the ears,
f. welding said plug to the side of the gear opposite said radial face,
g. boring an axial circular hub hole through the plug and lock plate, and
h. broaching said hub hole to a hexagonal hole with said slot at a corner of said hexagonal hole.

8. The method of repairing
a. a gear assembly having,
   i. a gear with a radial face,
   ii. gear teeth at its periphery,
   iii. a circular gear hole at its axis, and
   iv. a worn hub with a hexagonal hole in said circular hole,
b. said hexagonal hole being worn and misshaped; comprising the steps of:
c. removing and discarding said worn hub from said gear,
d. pressing a cylindrical plug in said circular hole with a radial face of said plug flush with said radial face,
e. placing a lock plate on said radial face, said lock plate having a cylindrical portion co-axial with said cylindrical plug with two ears projecting therefrom, and a slot extending to about the axis of the cylindrical portion between the two ears,
f. welding said lock plate to said radial face along an arc away from the ears,
g. welding said plug to the side of the gear opposite said radial face,
h. boring an axial circular hub hole through the plug and lock plate, and
j. broaching said hub hole to a hexagonal hole with said slot at a corner of said hexagonal hole.

* * * * *